UNITED STATES PATENT OFFICE.

KARL SCHIRMACHER, FRIEDRICH SCHMIDT, CARL PRETZELL, AND WILLY SCHUMACHER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ORTHO-OXYMONOAZO DYE AND PROCESS OF MAKING SAME.

No. 827,468.     Specification of Letters Patent.     Patented July 31, 1906.

Application filed January 4, 1906. Serial No. 294,655.

*To all whom it may concern:*

Be it known that we, KARL SCHIRMACHER, Ph. D., FRIEDRICH SCHMIDT, Ph. D., and CARL PRETZELL, Ph. D., chemists, citizens of the Empire of Germany, and WILLY SCHUMACHER, Ph. D., chemist, a citizen of the United States of America, residing at Höchst-on-the-Main, Germany, have invented certain new and useful Improvements in the Manufacture of Ortho-Oxymonoazo Dyestuffs, of which the following is a specification.

This invention relates to an improvement in the manufacture of ortho-oxymonoazo dyestuffs from chromotropic acid and ortho-amino-oxybenzene derivatives containing no sulfo group, which consists in allowing the diazo compounds of said aminophenols to act on chromotropic acid not under the usual conditions, but in presence of hydroxids of elements being the five middle members of the second group of the periodical system—namely, magnesium, calcium-strontium, barium, and zinc.

The practical value of this process consists in that a good yield of monoazo dyestuffs is obtained by combining chromotropic acid with the diazotized ortho-amino-oxybenzene derivatives having no sulfo group in presence of said hydroxids, whereas no formation of dyestuff occurs at all or only insufficiently in presence of caustic alkalies. In presence of said hydroxids the transformation of said diazotized ortho-amino-oxybenzene derivatives with chromotropic acid occurs at ordinary temperatures or if in presence of hydroxids of magnesium and zinc better at a temperature of from 30° to 40° centigrade and in general in the course of several hours. From the solution of the action the dyestuff may be isolated by acidifying and adding common salt.

The dyestuffs obtainable dye wool in an acid-bath red to red-violet up to violet, and these dyeings turn when treated with chromates into fast blue shades. Blue shades are also directly obtained on chrome mordanted wool.

Particularly beautiful dyestuffs are obtained with ortho-aminophenols being at the same time derivatives of paranitranilin.

As ortho-aminophenols are used in this process, for instance: ortho-aminophenol, ortho-amino-para-cresol, ortho-amino-meta-xylenol, para-chloro-ortho-aminophenol, para-bromo-ortho-aminophenol, ortho-para-dichloro-ortho-aminophenol, ortho-para-dibromoaminophenol, chloro-amino-cresols, $(OH:NH_2:CL:CH_3 = 1:2:6:4$ and $1:2:4:6,)$ acetamino-amino phenols, $(OH:NH_2:NHAc = 1:2:4$ and $1:2:5,)$ chloro-acetamino-aminophenols, $(OH:NH_2:CL:NHAc = 1:2:4:5$ and $1:2:4:6,)$ acetamino-aminocresol, $(OH:NH_2:CH_3:NHAc = 1:2:4:5,)$ amino-oxybenzoic acid, $(OH:NH_2:COOH = 1:2:4,)$ acetamino-amino-oxybenzoic acid, $(OH:NH_2:COOH:NHAc = 1:2:4:5,)$ amino-oxybenzoic acid methyl ester, $(OH:NH_2:COOCH_3 = 1:2:4$ and $1:2:5,)$ nitro-aminophenol, $(OH:NH_2:NO_2 = 1:2:5,)$ nitro-aminocresol, $(OH:NH_2:CH_3:NO_2 = 1:2:4:5,)$ nitro-chloro-aminophenol, $(OH:NH_2:CL:NO_2 = 1:2:4:5,)$ nitro-amino-oxybenzoic acid, $(OH:NH_2:COOH:NO_2 = 1:2:4:5,)$ nitro-chloro-amino-oxybenzoic acid, $(OH:NH_2:CL:NO_2:COOH:NO_2 = 1:2:4:5:6.)$ The manufacture of the new dyestuffs may be illustrated, for instance, as follows:

Example: 15.4 kilograms of ortho-amino-meta-nitrophenol $(OH:NH_2:NO_2 = 1:2:5)$ are dissolved in twenty-five kilograms of hydrochloric acid of about 20° Baumé specific gravity and diazotized with 6.9 kilograms of nitrite. The diazo compound is run into a solution of thirty-eight kilograms of the disodium salt of 1.8-dioxynaphthalene-2.6-disulfonic acid, which is stirred with twenty-five kilograms of lime. After a few hours it is filtered and the dyestuff is isolated from the solution by adding hydrochloric acid and common salt. It is a powder of dark-bronze luster, soluble with a blue-red color in water, in concentrated sulfuric acid with a red-blue color. On chrome mordanted wool it dyes a fast greenish-blue shade. In an acid-bath wool is dyed blue-red, and this shade turns to blue when treated with chromates.

Having now described our invention, what we claim is—

1. The process herein described for the manufacture of ortho-oxymonoazo dyestuffs from chromotropic acid and diazotized ortho-amino-oxybenzene derivatives containing no sulfo group, which consists in allowing said components to act on each other in presence of hydroxids of elements being the five middle members of the second group of the periodic system.

2. The process herein described for the manufacture of ortho-oxyazo dyestuffs from chromotropic acid and diazotized ortho-amino-oxybenzene derivatives, being at the same time derivatives of the para-nitranilin which consists in allowing said components to act on each other in presence of hydroxids of elements being the middle members of the second group of the periodic system.

3. The process herein described for the manufacture of ortho-oxyazo dyestuffs from chromotropic acid and diazotized ortho-amino-meta-nitrophenol, $$OH:NH_2:NO_2 = 1:2:5,$$

which consists in allowing the said components to act on each other in presence of hydrate of lime.

4. As new product, the azo dyestuff which corresponds to the formula $$NO_2-C_6H_3(OH)N=N-C_{10}H_3(OH)_2(SO_3N_a)_2$$

and which is decomposed by reduction into oxy-para-phenylenediamin and amido-chromotropic acid, being a powder of dark-bronze luster, soluble in water with blue-red color, in concentrated sulfuric acid with a red-blue color; it dyes wool in an acid-bath blue-red, the dyeings when treated with chromates turn greenish blue and chrome mordanted wool is also directly dyed greenish blue.

In testimony that we claim the foregoing as our invention we have signed our names in presence of two subscribing witnesses.

KARL SCHIRMACHER.
FRIEDRICH SCHMIDT.
CARL PRETZELL.
WILLY SCHUMACHER.

Witnesses:
  JEAN GRUND,
  CARL GRUND.